United States Patent
O'Hara et al.

(10) Patent No.: US 11,178,177 B1
(45) Date of Patent: Nov. 16, 2021

(54) SYSTEM AND METHOD FOR PREVENTING SESSION LEVEL ATTACKS

(71) Applicant: Arbor Networks, Inc., Westford, MA (US)

(72) Inventors: Sean O'Hara, Ypsilanti, MI (US); Conner Jones, Bay City, MI (US)

(73) Assignee: Arbor Networks, Inc., Westford, MA (US)

( * ) Notice: Subject to any disclaimer, the term of this patent is extended or adjusted under 35 U.S.C. 154(b) by 32 days.

(21) Appl. No.: 16/874,890

(22) Filed: May 15, 2020

(51) Int. Cl.
*H04L 29/06* (2006.01)

(52) U.S. Cl.
CPC ...... *H04L 63/1466* (2013.01); *H04L 63/0869* (2013.01); *H04L 63/0892* (2013.01); *H04L 63/1458* (2013.01)

(58) Field of Classification Search
CPC ............. H04L 63/1466; H04L 63/1458; H04L 63/0892; H04L 63/0869
See application file for complete search history.

(56) References Cited

U.S. PATENT DOCUMENTS

2014/0181968 A1*  6/2014  Ge ................. H04L 63/1425
                                                      726/23
2018/0124082 A1*  5/2018  Siadati ............... G06N 5/047

* cited by examiner

*Primary Examiner* — Huan V Doan
(74) *Attorney, Agent, or Firm* — Locke Lord LLP; Scott D. Wofsy; Christopher J. Capelli

(57) ABSTRACT

A computer method and system for mitigating a Session Level Attack (SLA) upon one or more internet hosted sought user accounts. A login request for a sought user account is received and Layer 3 information regarding the login request is utilized to determine existence of a SLA threat. One or more mitigations actions is performed on the login request to determine if a SLA threat exists based upon the utilization of Layer 3 information. Next, Layer 7 information regarding the login request is utilized to determine existence of a SLA threat wherein the Layer 7 information is only utilized to determine the existence of a SLA threat when no SLA threat was determined through utilization of the Layer 3 information. One or more mitigations actions is performed on the HTTP login request if the existence of a SLA threat exists based upon the utilization of the Layer 7 information.

14 Claims, 2 Drawing Sheets

SYSTEM AND METHOD FOR PREVENTING SESSION LEVEL ATTACKS

FIELD OF THE INVENTION

The disclosed embodiments generally relate to securing a network from malicious attacks, and more particularly, to preventing system level attacks upon a network.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system. In this regards, implementation of login rate limiters have proven effective in thwarting such Dos flooding attacks.

However, even though implementation of login rate limiters and blacklists are commonplace in network security, particularly useful for preventing account hijacking and Denial of Service (DoS), it is to be appreciated that rate limiting also enables a Session Level Attack (SLA) to be targeted at an individual user. Generally, an SLA occurs when an attacker exploits a traditional DoS countermeasure (like a rate limiter) to prevent a legitimate user from accessing their account. Session hijacking is an attack where a user session is taken over by an attacker. A session starts when you log into a service, for example your banking application, and ends when you log out. The attack relies on the attacker's knowledge of your session cookie (hence, why it is also commonly referred to as a cookie hijacking or cookie side-jacking). Although any computer session could be hijacked, session hijacking most commonly applies to browser sessions and web applications. For instance, when a user logs into a web application, the server sets a temporary session cookie in the user's browser to remember the user is currently logged in and authenticated. It is noted HTTP is a stateless protocol and session cookies attached to HTTP headers is a very common method for the server to identify your browser or your current session. Thus, to perform session hijacking, an attacker typically needs to know the victim's session ID (session key). This is often obtained by stealing the session cookie or persuading the user to click a malicious link containing a prepared session ID. In both scenarios, after the user is authenticated on the server, the attacker can take over (hijack) the session by using the same session ID for their own browser session. The server is then fooled into treating the attacker's connection as the original user's valid session.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with the illustrated embodiments, the methods and systems disclosed herein protect servers from network Service Level Attacks by providing a security process that processes application specific events to make automated decisions based on calculated confidence scores which correlate network layer, location data, and application layer indications, preferably in a cloud native deployment platform.

To achieve these and other advantages and in accordance with the purpose of the illustrated embodiments, in one aspect a computer method and system for mitigating a Session Level Attack (SLA) upon one or more user accounts is disclosed in which a login request is received for a sought user account. First, preferably a determination is made as to whether an alert exists for a source address associated with the login request (e.g., one or more failed login attempts over a prescribed period of time occurred for the source address associated with the login request). A determination is then made as to whether a confidence score associated with the sought user account is less than a confidence threshold value when an alert exists for the source address associated with the login request for the sought user account. One or more mitigation actions is then performed upon the login request when an alert exists for the source address and the confidence score associated with the source address is less than the confidence threshold value. Next, a determination is made as to whether an alert exists for a user ID associated with the sought user account (e.g., one or more failed login attempts over a prescribed period of time occurred for the user ID associated with the login request). One or more mitigation actions is then performed upon the login request if an alert exists for the user ID associated with the sought user account and the confidence score associated with the user account is less than the confidence threshold value. A login request is permitted to the sought user account when either no alerts exists for the user ID associated with the sought user account or the confidence score associated with the sought user account is less than the confidence threshold value.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims. Generally, and as described below, the present illustrated embodiments relate to a system and method for detecting and mitigating Session Level Attacks.

Figure 1:
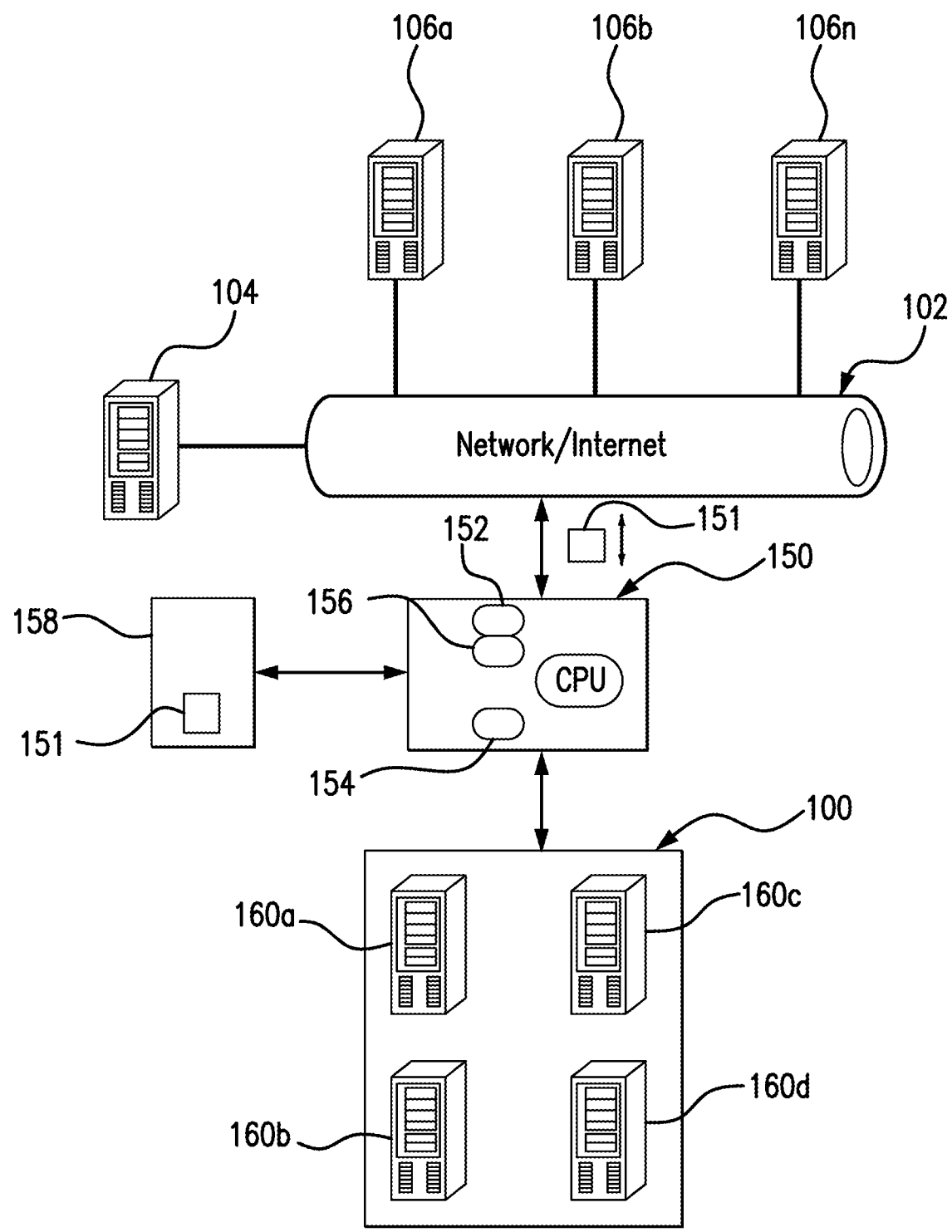
FIG. 1 illustrates an exemplary network communications system, in which an illustrative embodiment may be implemented.

Turning now descriptively to the drawings, in which similar reference characters denote similar elements throughout the several views, FIG. 1 illustrates a generalized monitoring/countermeasure system for detecting and mitigating a service level attack upon a protected group of servers. The exemplary embodiment of FIG. 1 depicts the relationship between a protected network 100, protection system 150 (such as a network monitoring device), Network/Internet 102, and external host devices 106a-106n. It is to be appreciated that protected network 100 includes a plurality of servers 160a-160n preferably consisting of a plurality of server types, including, but not limited to: Generic; Web; DNS; Mail; VoIP; VPN; RLogin; and File Servers. It is to be appreciated that in accordance with an illustrated embodiment, the protection system 150 is configured and operable to protect servers, preferably providing web based applications requiring a login process (e.g., baking applications) from network Service Level Attacks (SLA) by providing a security process that processes application specific events to make automated decisions based on calculated confidence scores which correlate network layer, location data, and application layer indications, preferably in a cloud native deployment platform (e.g., at an edge of the network 100).

It is to be appreciated that the illustrated embodiment of FIG. 1 is merely provided for ease of discussions purposes for depicting a generalized exemplary environment of use for a security protection system preferably using IP location services. As such, it is to be understood the illustrated embodiment of FIG. 1 is not to be understood to be limiting, as other system configurations are capable of carrying out the disclosed illustrated method for preventing SLA attacks. In a typical implementation, the external host devices 106a-106n (also referred to as external devices or host devices) attempt to connect to protected network server devices 160a-160n within a protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a protection system 150 preferably located between the Internet 102 and the protected network 100, preferably at a network nodal edge relative to the protected network. Usually, the protected network 100 is an enterprise network, such as a school network, business network, and government network, to list a few examples. It is to be appreciated however that in other embodiments, the protection system 150 may be located within the Internet, service provider network or enterprise network rather than as a network edge as illustrated. It is to be appreciated that when deployed within the protected network 100, traffic is diverted to the protection system 150.

The protection system 150 preferably includes a packet processing system preferably having an external high speed network interface 152 and a protected high-speed network interface 154. Typically, these interfaces are capable of handling 1-100 Gbps, for example. System 150 may further include processing modules, such as traffic analyzer 156 that preferably process the packets received at interfaces 152 and 154. Additionally, a central processing unit (CPU), random access memory (RAM), and one or more storage mediums/databases 158 are preferably connected through buses and are used to further support the threat detection processing of the received packets in accordance with the illustrated embodiments. Computer code is preferably stored in storage medium 158 and executed by the CPU of protection system 150. In one illustrated embodiment, the storage medium 158 may preferably include content-addressable memory (CAM), which is memory designed for use in very high speed searching applications. It is noted CAM memory operates different from the more commonly used random access memory (RAM). With RAM memory, a memory address is specified and the data stored at that address is returned. With CAM memory, the entire memory is searched to see if specified data are stored anywhere in the memory. The storage medium 158 may preferably store, capture, and collate sample network traffic data packets, as discussed further below.

In a typical implementation, the protection system 150 is configured and operable to detect and mitigate Session Level Attacks (SLA). In accordance with the illustrated embodiment disclosed herein, when a user logs into a service (e.g., a banking application), a message is generated and sent to the disclosed protective system. The protective system in accordance with the illustrated embodiments preferably enriches a raw event with additional data such as the country of origin of the login. Events are then filtered and binned to calculate a confidence score regarding the certainty that the login attempt is indeed a Service Level Attack. For instance, if a confidence score is high, alerts are sent to a message queue where preferably any point of mitigation can then receive the alert. Points of mitigation could be a layer 7 proxy inspecting http headers and session tokens, and/or a layer 3 blacklist dropping requests at the edge of the network. When a point of mitigation pulls an alert from the message queue, it preferably makes decisions regarding the type of mitigation action to conduct based upon the alert. Decisions about mitigation are preferably enforced, and the duration of the mitigation action is preferably based on a combination of the confidence score in the alert and a mitigator's ability to enforce. For instance, an application layer proxy may focus upon high level information present in an alert (User ID, Session token, etc), while a network layer blacklist may focus upon low level information (source IP address, protocol, port, etc).

Figure 2:
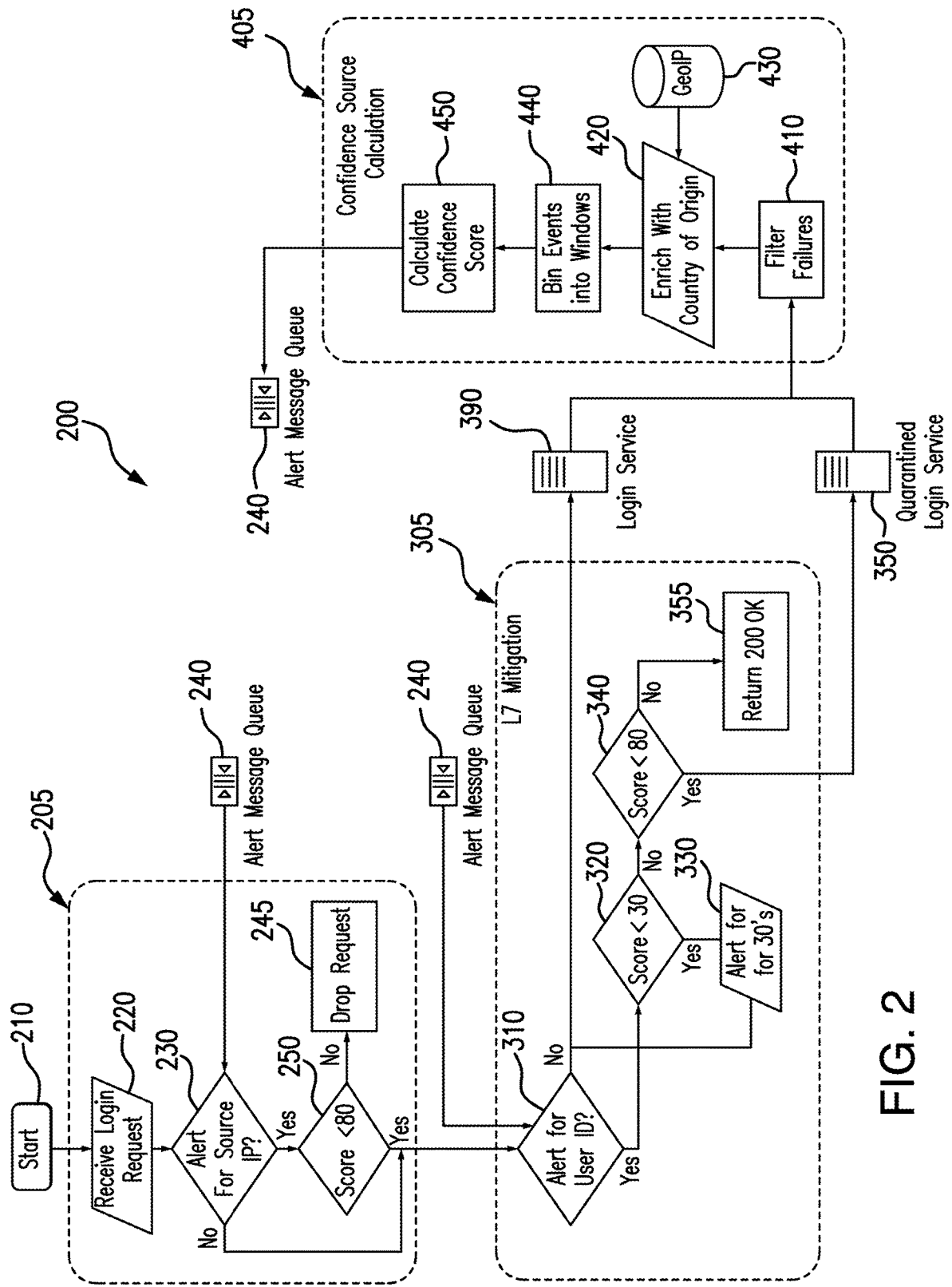
FIG. 2 is a flowchart depicting certain operational steps performed in accordance with an illustrative embodiment for preventing Service Level Attacks.

With reference now to FIG. 2 (and with continuing reference to FIG. 1) shown is flowchart depicting certain operational steps (process 200) performed by the protection device 150 in accordance with illustrative embodiments. Before turning to the descriptions of FIG. 2, it is noted that the flow diagram shown therein is described, by way of example (and with reference to components shown in FIG. 1), and that these operational steps may be carried out in any capable system and are not to be limited to the scenario shown in the aforementioned figures. Additionally, the flow diagram in FIG. 2 shows examples in which operational steps are carried out in a particular order, as indicated by the lines connecting the blocks, but the various steps shown in these diagrams can be performed in various orders, or in other combinations or sub-combinations. For instance, in some embodiments, some of the steps described below may be combined into a single step, and other embodiments, one or more additional steps may be included.

Starting at step 210, a first process sub-routine 205 is performed to preferably perform one or more mitigations actions on a HTTP login request if the existence of a SLA threat exists based upon the utilization of the Layer 3 information. Traffic flow 151 (e.g., including a HTTP login request for a sought user account) is received by the protection device 150, step 220. It is to be appreciated the traffic flow may be data packets transmitted to the protected devices 160a-160d from the external devices 104, 106a-106d seeking a login process, such as for a web based application (e.g., a banking application) hosted by one of the servers 160a-160d in the protected network 100, wherein preferably a sample of data packets associated with the network external devices 104, 106a-106n having a login request for one or more of the servers 160a-160d in the protected network 100 are intercepted and captured from the data packet traffic flow 151. Next, at step 230, a source address associated with the login request is extracted and identified to make a determination as to whether if an alert indicator exists for the identified source address (e.g., utilization of Layer 3 information present in the login request) that is associated with the login request. Preferably, the alert indicator indicates the identified source address is associated with one or more failed login events indicating a possible SLA. The alert indicator is preferably provided from database 240, as described further below. Additionally, a calculated confidence score associated with the login request 220 is accessed (e.g., from database 240) and utilized in accordance with process 200 as described below. It is to be appreciated the process for populating and updating alert indicators, and user account confidence scores in database 240 is described below, particularly with regards to sub-routine 405.

If yes (an alert indicator exists for the identified source address), then at step 250 a determination is made as to whether if a confidence score associated with the source address is less than a prescribed primary confidence threshold value (e.g., 80). As to be further described below (again with particular regards to sub-routine 405), the confidence score is dependent upon a number of failed login attempts to the aforesaid sought user account. If no, step 245 (the confidence score associated with the source address is less than a prescribed confidence threshold value), then one or more mitigation actions are performed upon the login request. One such mitigation action includes dropping the login request (step 245). It is to be further appreciated the aforesaid primary confidence threshold value (e.g., 80), and below discussed secondary threshold value (e.g., 30) are both user configurable, preferably by a network user and/or administrator.

With reference now to sub-routine 305, if either 1) there was no alert indicator for the identified source address (step 230); or 2) if the confidence score associated with the source address is higher than a prescribed confidence threshold value (step 250), then the SLA detection/mitigation process proceeds to sub-routine process 305. Sub-routine process 305 preferably includes performing one or more mitigation actions on the HTTP login request (220) if the existence of a SLA threat exists based upon the utilization of the Layer 7 information regarding the HTTP login request (220) to determine existence of a SLA threat.

Starting at step 310, a user ID associated with the sought user account is extracted and identified to make a determination as to whether an alert indicator (preferably from database 240) exists for the identified user ID. Preferably, the alert indicator indicates the identified user ID is associated with one or more failed login events indicating a possible SLA. If no, then the login request (220) is permitted to proceed to login into a web application hosted by a server 160a-160d preferably as normal (step 390). If yes (an alert indicator exists for the identified user ID), then one or more mitigation actions are preferably performed upon the login request utilizing the aforesaid confidence score associated with the source address, as now described. At step 320 a determination is made to determine whether the confidence score associated with the sought user account is less than a secondary prescribed confidence threshold value (e.g., 30), wherein the secondary threshold value (e.g., 30) is less that the aforesaid primary confidence threshold value (e.g., 30). It is to be appreciated this occurrence indicates that while there is a risk associated with the present login request (220), it is a relatively low risk requiring less intrusive mitigation actions. For instance, if the confidence score is less than the secondary confidence threshold value (step 320), then the login request (220) is rate limited to a prescribed traffic flow rate, such as for example (but not limited thereto) rate-limit by request (e.g., 1 request per second, 1 request per every 10 seconds, etc.) or the rate limiting may be by a prescribed limit (e.g., 30 Mbps), step 330. Thereafter, the rate limited login request is then permitted to proceed to login into a web application hosted by a server 160a-160d preferably as normal (390). If no (the confidence score associated with the sought user account is greater than a secondary prescribed confidence threshold value)(step 320), then a determination is conducted as to whether the confidence score associated with the sought user account is less than the aforesaid primary confidence threshold value (e.g., 80), step 340. It is to be appreciated this occurrence indicates that while there is a risk associated with the present login request (220), the login request is nevertheless permitted to continue subject to more restrict mitigation actions. For instance, if the confidence score is less than the primary confidence threshold value (e.g., 80) (step 340) but greater than the secondary confidence value (e.g., 30), then the login request (220) is permitted to proceed but is now subject to a quarantined login process (350).

If the confidence score associated with the sought user account is greater than the primary confidence threshold value)(e.g., 80)(step 340), then a more severe SLA mitigation action is performed on the login request (220) relative to the mitigation action performed when the confidence score was greater than the secondary confidence threshold value (step 320) but less than the primary confidence threshold value (step 340). An example of such a severe SLA mitigation action may include sending an HTTP 200 OK response with regards to the received login request (220) and taking no further action on the login request (step 355).

With the aforementioned sub-routines for detecting and mitigating against a SLA utilizing Layer 3 information (sub-routine 205) and Layer 7 information (sub-routine 305), the process for determining a confidence score for a login request/event (220) associated with a user account will now be discussed with regards to sub-routine 405. Starting at step 410, and in accordance with the illustrated embodiments, for all login events to a user account, whether successful or unsuccessful (e.g., incorrect password entered) via either the normal login process (step 390) or the quarantined login process (step 350), such login events are preferably filtered to remove all successful login events from any further processing. Thus, only unsuccessful login events are processed to calculate the confidence score regarding a user account sought via the received login request (220). Next, at step 420, for each unsuccessful login event, its data is enriched with geographic data indicating the geographic origin for the login event (220) (e.g., country of origin) preferably using the IP address associated with the login event (220). It is to be appreciated that the country of origin data is preferably provided via a database 430 which is populated and periodically updated with geographic location data (e.g., a listing of IP addresses and associated countries of origin). Next, at step 440, the unsuccessful login event (220) is binned into Windows (e.g., logging all unsuccessful login events for the sought user account (220) for a prescribed period of time (e.g., 1 hour)), thus all unsuccessful login events are maintained in a file for a prescribed period of time (e.g., 1 hour). Next, at step 450, the confidence score for the sought user account associated with the login attempt/event (220) is calculated/updated to equal a value (score) that is preferably proportional to a number of failed login attempts associated with the user account over a prescribed period of time (e.g, 1 hour), preferably as a percentage. For instance, an increase in a number of failed login attempts to a sought user account for a sixty (60) min period of time will result in a lower confidence for that sought user account, meaning the aforesaid sought user account is determined to be more likely to be subject to a SLA resulting in heightened SLA detection and mitigation as described above in subroutines 205 and 305. The aforementioned calculated confidence score (step 450) for each sought user account is preferably stored/updated in the database 240. Additionally, the database 240 is further preferably configured to store a listing of IP addresses (as used in step 230) and User ID's (as used in step 310) associated with one or more failed login events preferably occurring over a prescribed period of time (e.g., 1 hour).

Accordingly, as set forth above, the system and method in accordance with the illustrated embodiment sets for a combination of processing application specific events and conducting automated decisions based on calculated confidence scores which correlate network layer, location data, and application layer indications, preferably in a cloud native deployment platform.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method performed by a computer system having one or more processors and memory for storing one or more programs for execution by the one or more processors for mitigating a Session Level Attack (SLA) upon one or more user accounts, comprising the steps:

receiving a login request for a user account;

determining if an alert exists for a source address associated with the login request;

determining if a confidence score associated with the sought user account is less than a confidence threshold value when an alert exists for the source address associated with the login request for the sought user account, wherein the confidence score is dependent upon a number of failed login attempts to the user account;

performing one or more mitigation actions upon the login request when an alert exists for the source address and the confidence score associated with the user account is less than a confidence threshold value;

determining if an alert exists for a user ID associated with the sought user account;

performing one or more mitigation actions upon the login request if an alert exists for the user ID associated with the sought user account and the confidence score associated with the user account is less than the confidence threshold value; and permitting the login request to the user account when either no alerts exists for the user ID associated with the sought user account or the confidence score associated with the sought user account is less than the confidence threshold value.

2. The method as recited in claim 1, wherein performing one or more mitigation actions upon the login request when an alert exists for the source address and the confidence score associated with the source address is less than a confidence threshold value includes dropping the login request.

3. The method as recited in claim 1, further including the step of performing no further login actions upon the login request if an alert exists for the user ID associated with the sought user account and the confidence score associated with the sought user account is greater than the confidence threshold value.

4. The method as recited in claim 1, wherein performing one or more mitigation actions upon the login request if an alert exists for the user ID associated with the sought user account includes providing a quarantined login process for the sought user account when the confidence score is less than the confidence threshold value.

5. The method as recited in claim 1, wherein performing one or more mitigation actions upon the login request if an alert exists for the user ID associated with the sought user account includes rate limiting the login process to the sought user account when the confidence score is less than a secondary threshold value wherein the secondary threshold value is less that the confidence threshold value.

6. The method as recited in claim 1, further including determining the confidence score for a user account by calculating a value proportional to a number of failed login attempts associated with the user account over a period of time.

7. The method as recited in claim 6, further including enriching the login request to a sought user account with geographic location data corresponding to the geographic origination location associated with a failed login request.

8. The method as recited in claim 1, wherein the confidence threshold value is adjustable by a network administrator.

9. The method as recited in claim 8, wherein the confidence threshold value used when an alert exists for a source address associated with the login request is different than the confidence threshold value used when an alert exists for a user ID associated with the user account.

10. The method as recited in claim 1, wherein the source address associated with the login request is an IP address.

11. The method as recited in claim 1, wherein each of the alerts for whether a source address is associated with the login request exits and whether a user ID is associated with the user account exists is provided from one or more periodically updated databases.

12. The method as recited in claim 1, wherein the indicated alert for a source address associated with the login request indicates existence of one or more failed login events for the sought user account over a prescribed period of time.

13. The method as recited in claim 1, wherein the indicated alert for a user ID associated with the login request indicates existence of one or more failed login events for the sought user account over a prescribed period of time.

14. A computer system for monitoring network traffic associated with a plurality of protected network servers for mitigating a Session Level Attack (SLA) upon one or more user accounts, comprising:
one or more data bases having memory configured to store instructions;
a processor disposed in communication with said memory, wherein said processor upon execution of the instructions is configured to:
receive a login request for a user account;
determine if an alert exists for a source address associated with the login request;
determine if a confidence score associated with the sought user account is less than a confidence threshold value when an alert exists for the source address associated with the login request for the sought user account, wherein the confidence score is dependent upon a number of failed login attempts to the user account;
perform one or more mitigation actions upon the login request when an alert exists for the source address and the confidence score associated with the user account is less than a confidence threshold value;
determine if an alert exists for a user ID associated with the sought user account;
perform one or more mitigation actions upon the login request if an alert exists for the user ID associated with the sought user account and the confidence score associated with the source address is less than the confidence threshold value; and
permit the login request to the user account when either no alerts exists for the user ID associated with the sought user account or the confidence score associated with the sought user account is less than the confidence threshold value.

* * * * *